US008779350B2

(12) United States Patent
Fedorin

(10) Patent No.: US 8,779,350 B2
(45) Date of Patent: Jul. 15, 2014

(54) DENSITY DERIVED FROM SPECTRA OF NATURAL RADIOACTIVITY

(75) Inventors: Mikhail A. Fedorin, Novosibirsk (RU); Albert Alexseevich Fedorin, legal representative, Novosibirsk (RU)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/514,196

(22) PCT Filed: Jul. 4, 2011

(86) PCT No.: PCT/RU2011/000480
§ 371 (c)(1),
(2), (4) Date: Nov. 1, 2012

(87) PCT Pub. No.: WO2013/006073
PCT Pub. Date: Jan. 10, 2013

(65) Prior Publication Data
US 2013/0092829 A1  Apr. 18, 2013

(51) Int. Cl.
G01V 5/04 (2006.01)
G01V 5/08 (2006.01)

(52) U.S. Cl.
USPC .................................... 250/256; 250/269.1

(58) Field of Classification Search
CPC ....... G01V 5/06; G01V 5/04; G01N 33/2823; G01N 33/24
USPC ........................................................ 250/256
See application file for complete search history.

(56) References Cited

U.S. PATENT DOCUMENTS

| 3,521,064 | A | * | 7/1970 | Moran et al. .................. 250/261 |
| 4,394,574 | A | * | 7/1983 | Grau et al. .................... 250/262 |
| 4,436,996 | A | * | 3/1984 | Arnold et al. ................. 250/256 |
| 4,529,877 | A | | 7/1985 | Arnold |
| 7,893,398 | B2 | * | 2/2011 | Georgi et al. ................. 250/265 |
| 2004/0065823 | A1 | | 4/2004 | Mickael |

FOREIGN PATENT DOCUMENTS

WO     2010124063 A2    10/2010

* cited by examiner

Primary Examiner — David Porta
Assistant Examiner — Mindy Vu
(74) Attorney, Agent, or Firm — Mossman Kumar & Tyler PC

(57) ABSTRACT

The present disclosure relates to borehole logging methods and apparatuses for estimating at least one parameter of interest of a volume of interest of an earth formation using nuclear radiation. The method may include obtaining an energy spectrum; using at least one processor to remove at least one energy spectrum component using a method selected from a spectral decomposition and spectral windows method; and estimating the concentration of at least one radionuclide using the energy spectrum after the removal. The estimation of the at least one radionuclide concentration may include using the other of the method selected form the removal. The apparatus may include at least one processor configured to perform the method.

12 Claims, 5 Drawing Sheets

DENSITY DERIVED FROM SPECTRA OF NATURAL RADIOACTIVITY

FIELD OF THE DISCLOSURE

This disclosure generally relates to borehole logging methods and apparatuses for estimating formation properties using nuclear radiation based measurements.

BACKGROUND OF THE DISCLOSURE

Oil well logging has been known for many years and provides an oil and gas well driller with information about the particular earth formation being drilled. Hydrocarbons are generally contained in reservoirs formed in rock formations with various lithologies. The type of lithology may provide information as to the size and location of hydrocarbon containing reservoirs. Information regarding the type of lithology encountered during exploration and production may provide indications of the location and extent of hydrocarbons in a given earth formation.

Studies of the earth formations indicate the regular occurrence of naturally radioactive elements in various proportions depending on the type of lithology. Commonly, radioactive isotopes of potassium, uranium, and thorium are found in earth formations. Additional radioactive isotopes may be generated in hydrocarbon bearing lithologies during nuclear logging. A rigid or non-rigid carrier is often used to convey the nuclear radiation detectors, often as part of a tool or a set of tools, and the carrier may also provide communication channels for sending information up to the surface.

SUMMARY OF THE DISCLOSURE

In aspects, the present disclosure is related to methods and apparatuses for estimating at least one parameter of interest of an earth formation using nuclear radiation measurements.

One embodiment according to the present disclosure may include a method of estimating a concentration for at least one radionuclide in an earth formation, comprising: obtaining an energy spectrum; using at least one processor to remove at least one energy spectrum component from the energy spectrum using a method selected from (i) a spectral decomposition and (ii) a spectral windows method; and estimating the at least one radionuclide concentration using the energy spectrum after the removal.

Another embodiment according to the present disclosure may include a computer-readable medium product having instructions thereon that, when executed, cause at least one processor to perform a method, the method comprising: obtaining an energy spectrum; using the at least one processor to remove at least one energy spectrum component from the energy spectrum using a method selected from (i) a spectral decomposition and (ii) a spectral windows method; and estimating the at least one radionuclide concentration using the energy spectrum after the removal.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
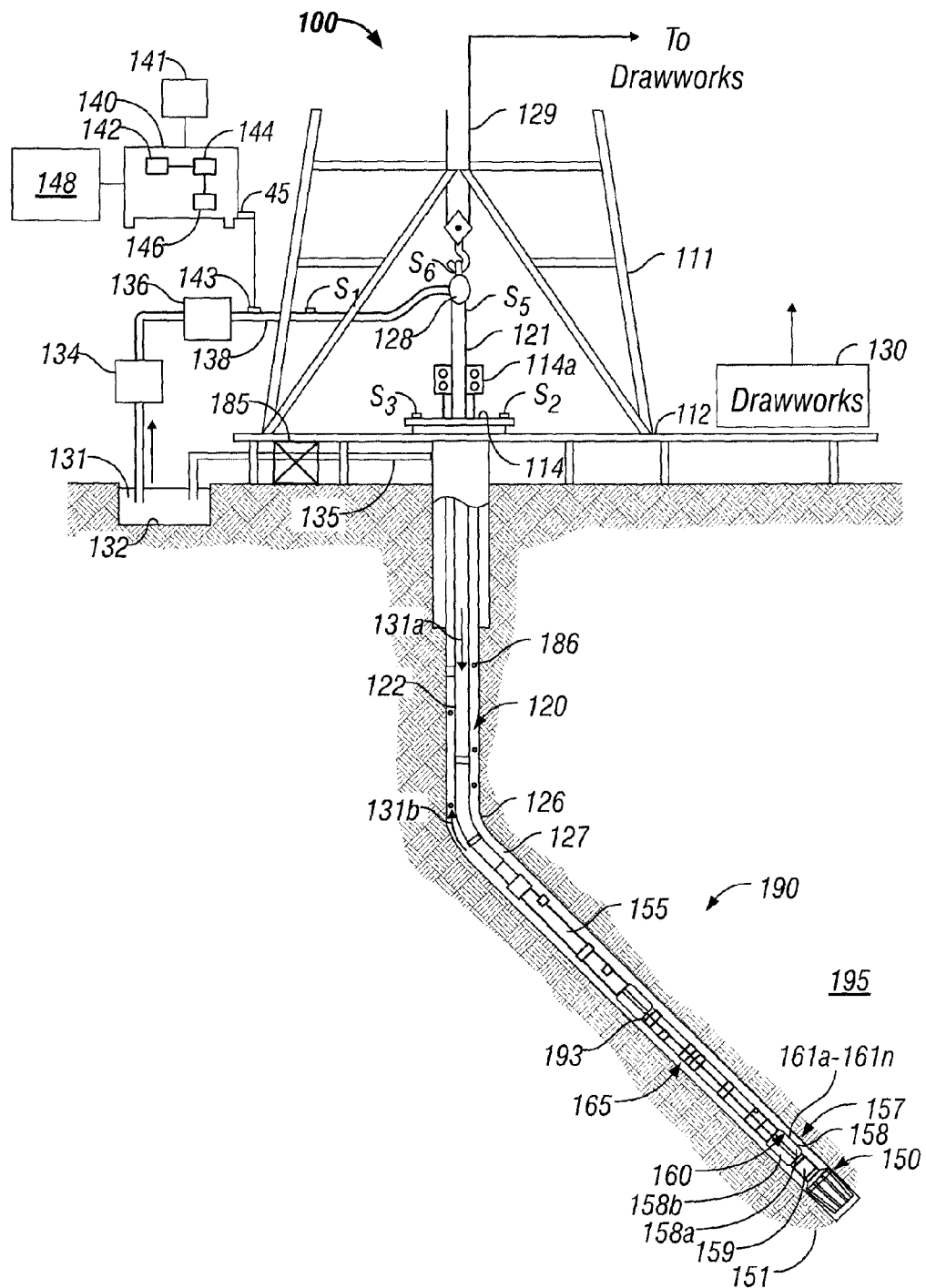
FIG. 1 shows a schematic of a downhole tool deployed in a borehole along a drill string according to one embodiment of the present disclosure.

In aspects, this disclosure relates to estimating at least one parameter of interest of an earth formation using nuclear radiation estimates.

The energy spectrum caused by radioactive decay of radionuclides may be used to estimate parameters of interest of an earth formation. The radioactive decay of radionuclides may produce nuclear radiation that may be detected by radiation detectors. Radionuclides may include, naturally occurring radionuclides, such as potassium-40, uranium, and thorium, which exist in the earth formation and borehole fluid and activated radionuclides, which may include radionuclides activated from the irradiation of nuclides with nuclear radiation.

Herein, the term "nuclear radiation" includes particle and non-particle radiation emitted by atomic nuclei during nuclear processes (such as radioactive decay and/or nuclear bombardment), which may include, but are not limited to, photons from neutron inelastic scattering and from neutron thermal capture reactions, neutrons, electrons, alpha particles, beta particles, and pair production photons. The term "activated" relates to the conversion of a normally stable nuclide into a radionuclide through a nuclear process, such as, but not limited to, neutron-proton (n,p) reactions and radiative capture (n,y). For example, nuclide iron-56 may be activated through a neutron-proton reaction to form radionuclide manganese-56. Nuclides that may be activated in the earth formation may include, but are not limited to, one or more of: aluminum, calcium, chlorine, iron, gadolinium, hydrogen, magnesium, manganese, sodium, sulfur, silicon, titanium, carbon, potassium, and oxygen.

The one or more nuclear radiation sensors disposed along the downhole tool may be configured to generate a signal indicative of the nuclear radiation detected. The detected nuclear radiation may include gamma rays. The detected nuclear radiation may be expressed as an energy spectrum. Since the energy spectrum may include energy spectrum components from multiple radionuclides, the nuclear radiation information may be separated to identify the energy spectrum components contained with the energy spectrum. Herein, "information" may include raw data, processed data, analog signals, and digital signals. The separated energy spectrum components may be used for estimating the concentration of at least one radionuclide in the volume of interest of the earth formation. The separation of the energy spectrum components may be performed in multiple stages, such that an earlier stage may "clean up" the information for a later stage. The separation of the energy spectrum components may include as at least one of the stages, a technique, including, but not limited to, one of: (i) an elemental standards based spectral decomposition (also known as a yields method) and (ii) a spectral windows method. The concentration of the at least one radionuclide may be used for estimating at least one parameter of interest of the volume of interest of the earth formation. A description for some embodiments estimating the at least one parameter of interest follows below.

FIG. 1 is a schematic diagram of an exemplary drilling system 100 that includes a drill string having a drilling assembly attached to its bottom end that includes a steering unit according to one embodiment of the disclosure. FIG. 1 shows a drill string 120 that includes a drilling assembly or bottom-hole assembly (BHA) 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe) 122, having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 respectively provide information about the torque and the rotational speed of the drill string 120. Tubing injection speed is determined from the sensor $S_5$, while the sensor $S_6$ provides the hook load of the drill string 120.

In some applications, the drill bit 150 is rotated by only rotating the drill pipe 122. However, in many other applications, a downhole motor 155 (mud motor) disposed in the drilling assembly 190 also rotates the drill bit 150. The rate of penetration (ROP) for a given BHA largely depends on the WOB or the thrust force on the drill bit 150 and its rotational speed.

The mud motor 155 is coupled to the drill bit 150 via a drive shaft disposed in a bearing assembly 157. The mud motor 155 rotates the drill bit 150 when the drilling fluid 131 passes through the mud motor 155 under pressure. The bearing assembly 157, in one aspect, supports the radial and axial forces of the drill bit 150, the down-thrust of the mud motor 155 and the reactive upward loading from the applied weight-on-bit.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165. The BHA 190 may further include a variety of other sensors and devices 159 for determining one or more properties of the BHA 190 (such as vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.) For convenience, all such sensors are denoted by numeral 159.

The BHA 190 may include a steering apparatus or tool 158 for steering the drill bit 150 along a desired drilling path. In one aspect, the steering apparatus may include a steering unit 160, having a number of force application members 161a-161n, wherein the steering unit is at partially integrated into the drilling motor. In another embodiment the steering apparatus may include a steering unit 158 having a bent sub and a first steering device 158a to orient the bent sub in the wellbore and the second steering device 158b to maintain the bent sub along a selected drilling direction.

The drilling system 100 may include sensors, circuitry and processing software and algorithms for providing information about desired dynamic drilling parameters relating to the BHA, drill string, the drill bit and downhole equipment such as a drilling motor, steering unit, thrusters, etc. Exemplary sensors include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED. Suitable systems are also discussed in "Downhole Diagnosis of Drilling Dynamics Data Provides New Level Drilling Process Control to Driller", SPE 49206, by G. Heisig and J. D. Macpherson, 1998.

The drilling system 100 can include one or more downhole processors at a suitable location such as 193 on the BHA 190. The processor(s) can be a microprocessor that uses a computer program implemented on a suitable machine readable medium that enables the processor to perform the control and processing. The machine readable medium may include ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 142 can process the surface measured data, along with the data transmitted from the downhole processor, to evaluate formation lithology. While a drill string 120 is shown as a conveyance system for sensors 165, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 100 may include a bottomhole assembly and/or sensors and equipment for implementation of embodiments of the present disclosure on either a drill string or a wireline. A point of novelty of the system illustrated in FIG. 1 is that the surface processor 142 and/or the downhole processor 193 are configured to perform certain methods (discussed below) that are not in prior art.

Figure 2:
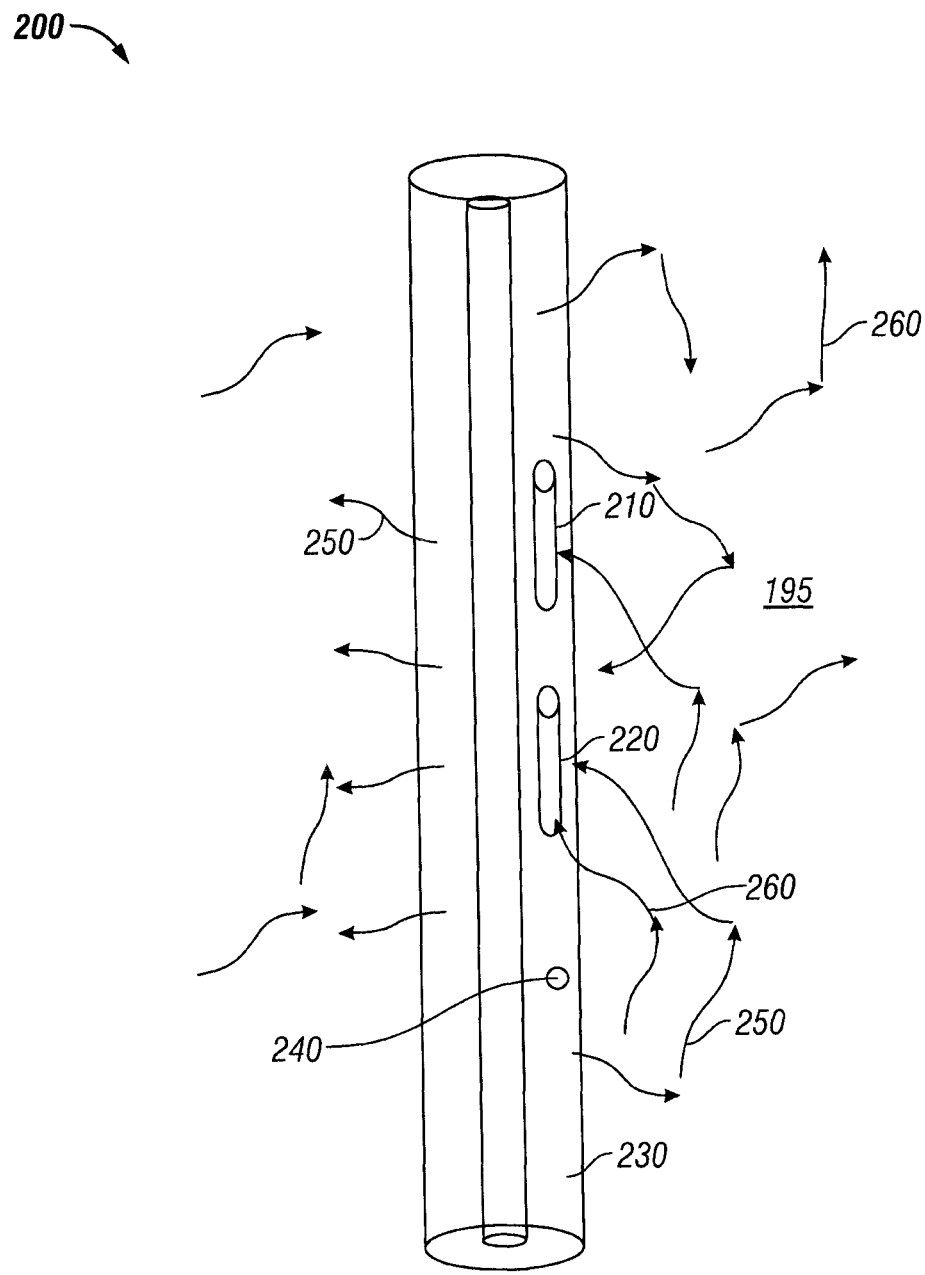
FIG. 2 shows a schematic of a nuclear radiation detection module for one embodiment according to the present disclosure.

FIG. 2 shows a nuclear detection module 200 that may be incorporated in BHA 190, such as along with evaluation sensors 165 according to one embodiment of the present disclosure. The nuclear detection module 200 may include one or more sensors 210, 220 configured to detect nuclear radiation disposed along a drill collar 230. The one or more nuclear radiation sensors 210, 220 may be spaced at different distances along the drill collar 230 apart from a neutron source 240. When neutron source 240 is turned on, emitted neutrons may generate radionuclides in the drill collar 230. The drill collar 230 may then serve as a gamma radiation source. When the neutron source 240 is turned off and after delayed neutron emissions have stopped, the drill collar 230 may still be emitting nuclear radiation 250 into the earth formation 195. The interaction with the nuclear radiation 250 and the earth formation 195 may result in nuclear radiation emissions 260 from the formation. Nuclear radiation emissions 260 may be the result of gamma ray scattering and/or absorption/emission by the earth formation 195. Detectors 210, 220 may receive nuclear radiation emissions 250 from the drill collar 230 and nuclear radiation emissions 260 from the earth formation 195. In some embodiments, neutron source 240 may be optional. In some embodiments, natural gamma ray emissions may be used instead of an active radiation source. In some embodiments, a gamma ray source (not shown) may be used as an alternative to a neutron source.

Figure 3:
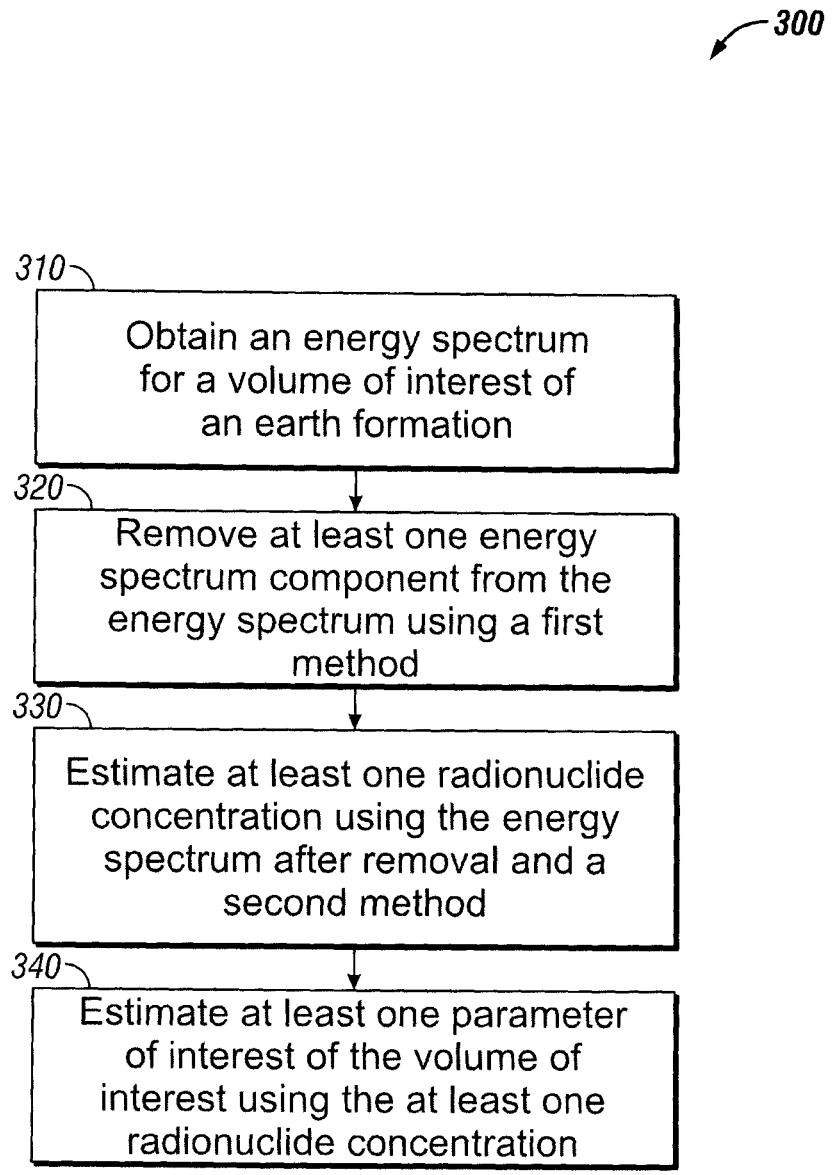
FIG. 3 shows a flow chart for a method for one embodiment according to the present disclosure.

FIG. 3 shows a flow chart 300 for estimating a parameter of interest of the earth formation 195 according to one embodiment of the present disclosure. In step 310, an energy spectrum for a volume of interest of the earth formation 195 may be obtained. The energy spectrum may include gamma ray spectra. In step 320, at least one energy spectrum component may be removed from the energy spectrum using at least one processor. The removal may include the use of one of: (i) a spectral decomposition and (ii) a spectral windows method. The spectral decomposition method is based on using elemental standards. Elemental standards may include unique energy spectra specific to one radionuclide that may be present in the earth formation. The combination of such unique spectra may form the energy spectra recorded by the detectors. In spectral decomposition methods, such elemental standards may be superimposed at various levels and the resulting spectrum may be compared to the recorded spectrum. The levels that provide the least error may be assumed to represent the actual concentration levels in the formation. In the spectral windows method, the energy spectrum may be divided into a plurality of energy bins, which may be grouped into one or more energy windows. The gamma ray counts in the energy bins may be integrated in the one or more energy windows. The energy windows may be selected such that the energy windows may be correlated to the concentrations of specific radionuclides. The concentration level may then be assigned to a specific radionuclide as a function of the counts in a given energy window. In step 330, a concentration of at least one radionuclide may be estimated using the at least one processor to perform the other method of step 320. In step 340, at least one parameter of interest of the volume of interest of the earth formation may be estimated using the at least one radionuclide concentration. The at least one parameter of interest may include, but is not limited to, one or more of: composition and mineralogy.

In some embodiments, the energy spectrum may be obtained by conveying at least one radiation detector 210 into a borehole 126 in the earth formation 195; irradiating the volume of interest using a neutron source 240; and generating a signal indicative of the energy spectrum using the at least one radiation detector 210. The at least one radiation detector 210 may be configured to generate a signal in response to gamma radiation. In some embodiments, natural gamma ray emissions may be used instead of an active radiation source. In some embodiments, a gamma ray source (not shown) may be used as an alternative to a neutron source 240.

In some embodiments, the removal may include removing an energy spectrum component due to gamma rays emitted by radionuclides that have built up in the drilling collar 230.

Figure 4A:
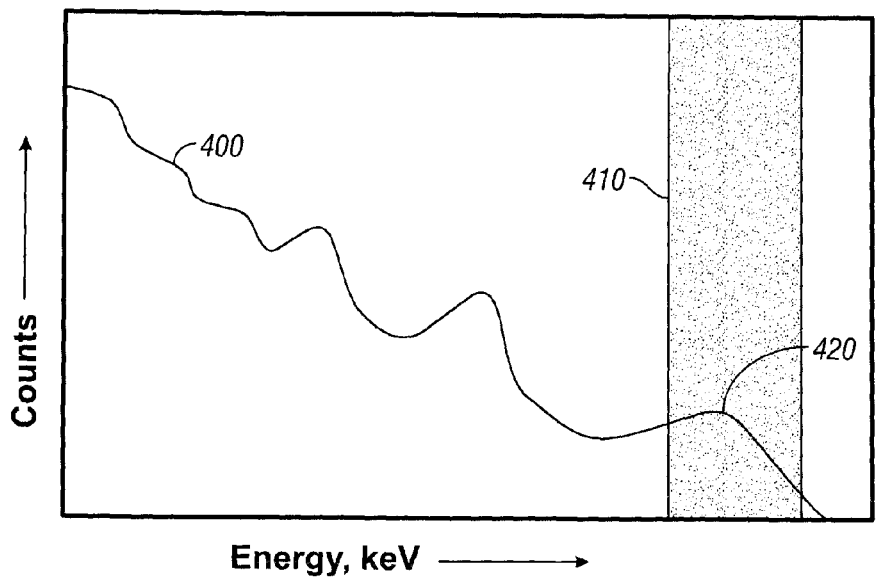
FIG. 4A shows a chart of an energy spectrum with an energy window for one embodiment according to the present disclosure.

FIG. 4A shows a chart containing an energy spectrum 400 estimated for the volume of interest in the earth formation 195. The recorded energy spectrum 400 may include multiple energy spectrum components, such that the sum of the energy spectrum components may be equal to the energy spectrum 400. Energy spectrum 400 may be expressed as follows:

$$E_T = \alpha_1 E_1 + \alpha_2 E_2 + \ldots \alpha_n E_n \quad (1)$$

where $E_T$ may be the energy spectrum 400, $E_1 \ldots n$ may represent energy spectrum components for a plurality of radionuclides, and $\alpha_{1 \ldots n}$ may represent the proportions of the radionuclides in the medium. Energy spectrum 400 may include energy peak 420.

An energy window 410 may be formed around energy peak 420. The energy window 410 may be used to estimate the concentration of the radionuclide causing for energy peak 420.

Figure 4B:
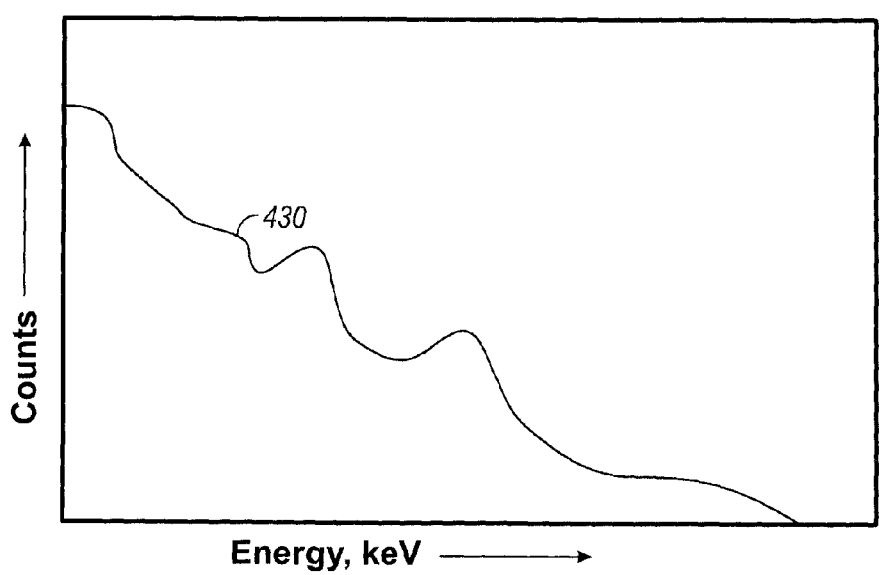
FIG. 4B shows a chart of an energy spectrum after removal of an energy spectrum component for one embodiment according to the present disclosure.

FIG. 4B shows a chart containing an energy spectrum 430, which may be energy spectrum 400 after removal of the energy spectrum component due to the radionuclide corresponding to energy peak 420. If the removed energy spectrum component is $\alpha_1 E_1$ from eqn. 1, then energy spectrum 430 may be expressed as:

$$E_{Tr\text{-}1} = \alpha_2 E_2 + \ldots \alpha_n E_n \qquad (2)$$

where $E_{Tr\text{-}1}$ represents reduced energy spectrum 430. With the removal of energy spectrum component $\alpha_1 E_1$, energy spectrum 430 may be separated into individual energy spectrum components corresponding to the plurality of radionuclides present in the volume of interest without interference from the presence of energy spectrum component $\alpha_1 E_1$. While this example only shows the removal of a single energy spectrum component, this is exemplary and illustrative only, as multiple energy spectrum components may be removed as desired to improve the quality of energy spectrum 430 for later separation into individual energy spectrum components.

Figure 5:
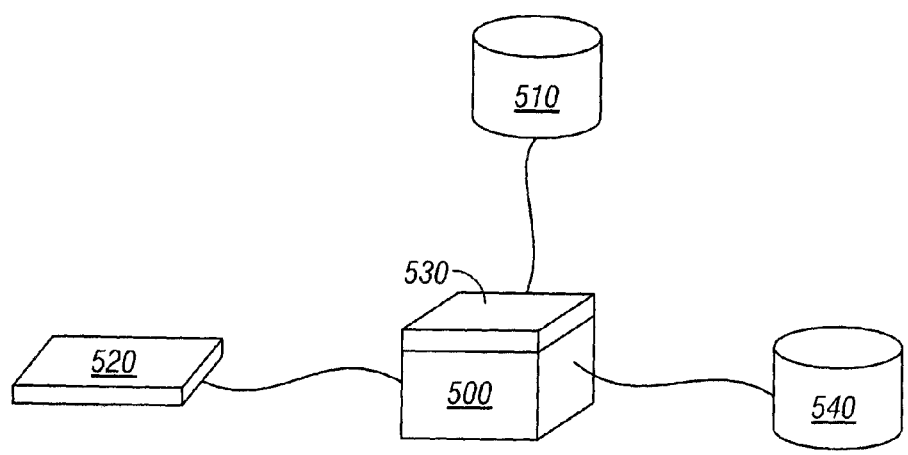
FIG. 5 shows a schematic of an apparatus for implementing one embodiment of the method according to the present disclosure.

As shown in FIG. 5, certain embodiments of the present disclosure may be implemented with a hardware environment that includes an information processor 500, a information storage medium 510, an input device 520, processor memory 530, and may include peripheral information storage medium 540. The hardware environment may be in the well, at the rig, or at a remote location. Moreover, the several components of the hardware environment may be distributed among those locations. The input device 520 may be any information reader or user input device, such as data card reader, keyboard, USB port, etc. The information storage medium 510 stores information provided by the detectors. Information storage medium 510 may be any standard computer information storage device, such as a ROM, USB drive, memory stick, hard disk, removable RAM, EPROMs, EAROMs, EEPROM, flash memories, and optical disks or other commonly used memory storage system known to one of ordinary skill in the art including Internet based storage. Information storage medium 510 stores a program that when executed causes information processor 500 to execute the disclosed method. Information storage medium 510 may also store the formation information provided by the user, or the formation information may be stored in a peripheral information storage medium 540, which may be any standard computer information storage device, such as a USB drive, memory stick, hard disk, removable RAM, or other commonly used memory storage system known to one of ordinary skill in the art including Internet based storage. Information processor 500 may be any form of computer or mathematical processing hardware, including Internet based hardware. When the program is loaded from information storage medium 510 into processor memory 530 (e.g. computer RAM), the program, when executed, causes information processor 500 to retrieve detector information from either information storage medium 510 or peripheral information storage medium 540 and process the information to estimate a parameter of interest. Information processor 500 may be located on the surface or downhole.

While the foregoing disclosure is directed to the one mode embodiments of the disclosure, various modifications will be apparent to those skilled in the art. It is intended that all variations be embraced by the foregoing disclosure.

The invention claimed is:

1. A method of estimating a concentration for at least one radionuclide in an earth formation, comprising:

obtaining an energy spectrum;

using at least one processor to remove at least one energy spectrum component from the energy spectrum using a method selected from (i) a spectral decomposition and (ii) a spectral windows method; and estimating the at least one radionuclide concentration using the energy spectrum after the removal by separating the energy spectrum after the removal into further energy spectrum components.

2. The method of claim 1, where the energy spectrum is obtained using at least one radiation detector in a borehole penetrating the earth formation.

3. The method of claim 2, wherein the at least one radiation detector is configured to detect gamma rays.

4. The method of claim 1, wherein the spectral windows method includes at least one window indicative of at least one of potassium, thorium, and uranium.

5. The method of claim 1, wherein the at least one energy spectrum component is indicative of at least one of: aluminum, calcium, chlorine, iron, gadolinium, hydrogen, magnesium, manganese, sodium, sulfur, silicon, titanium, carbon, potassium, and oxygen.

6. The method of claim 1, further comprising:

identifying at least one energy peak for the at least one radionuclide on the energy spectrum; and sizing and positioning an energy window for the at least one energy peak.

7. The method of claim 1, wherein separating the energy spectrum after the removal into further energy spectrum components comprises:

performing, on the energy spectrum after the removal, the other of the method selected in claim 1.

8. The method of claim 7, further comprising:

estimating at least one parameter of interest using the at least one radionuclide concentration.

9. The method of claim 8, wherein the at least one parameter of interest includes a composition of the earth formation.

10. A computer-readable medium product having instructions thereon that, when executed, cause at least one processor to perform a method, the method comprising:

obtaining an energy spectrum;

using the at least one processor to remove at least one energy spectrum component from the energy spectrum using a method selected from (i) a spectral decomposition and (ii) a spectral windows method; and estimating the at least one radionuclide concentration using the energy spectrum after the removal by separating the energy spectrum after the removal into further energy spectrum components.

11. The computer-readable medium product of claim 10 further comprising at least one of: (i) a ROM, (ii) an EPROM, (iii) an EEPROM, (iv) a flash memory, or (v) an optical disk.

12. The method of claim 1 wherein the removal includes removing an energy spectrum component due to gamma rays emitted by radionuclides that have built up in a drilling collar associated with obtaining the energy spectrum.

* * * * *